United States Patent [19]
Shipley

[11] Patent Number: 6,119,236
[45] Date of Patent: Sep. 12, 2000

[54] INTELLIGENT NETWORK SECURITY DEVICE AND METHOD

[76] Inventor: Peter M. Shipley, 2650 Bancroft Way #51, Berkeley, Calif. 94704-1700

[21] Appl. No.: 09/210,057

[22] Filed: Dec. 10, 1998

Related U.S. Application Data

[63] Continuation-in-part of application No. 08/726,563, Oct. 7, 1996, abandoned.

[51] Int. Cl.[7] .................................................. G06F 12/14
[52] U.S. Cl. ........................................ 713/207; 713/153
[58] Field of Search .................... 713/200, 201, 713/202, 153; 709/229; 380/3, 4, 25, 30

[56] References Cited

U.S. PATENT DOCUMENTS

| | | | |
|---|---|---|---|
| 5,343,524 | 8/1994 | Mu et al. | 380/4 |
| 5,414,833 | 5/1995 | Hershey et al. | 380/4 |
| 5,490,252 | 2/1996 | Macera et al. | 709/200 |
| 5,606,668 | 2/1997 | Shwed | 713/200 |
| 5,623,601 | 4/1997 | Vu | 713/201 |
| 5,896,499 | 4/1999 | McKelvey | 713/201 |
| 5,944,823 | 8/1999 | Jade et al. | 713/201 |

*Primary Examiner*—Robert W. Beausoliel, Jr.
*Assistant Examiner*—Pierre E. Elisca
*Attorney, Agent, or Firm*—Henneman & Saunders

[57] ABSTRACT

An intelligent network security device ("INSD") (10) operates in a local area network (""LAN") (12) according to an intelligent network security method (30). The LAN (12) has a plurality of computers (14) and connects to the internet (16) through a firewall (18). The INSD (10) resides within the LAN (12) such that data traversing between the LAN (12) and the internet (16) is accessible thereto. The INSD (10) looks for code and patterns of behavior and assigns a value to perceived attempted security breaches. The INSD (10) then directs the firewall (16) to take any of a prescribed plurality of actions, based upon such value.

19 Claims, 2 Drawing Sheets

Fig. 1

INTELLIGENT NETWORK SECURITY DEVICE AND METHOD

CROSS REFERENCE TO RELATED APPLICATION

This application is a continuation in part of U.S. patent application Ser. No. 08/726,563, filed Oct. 7, 1996, now abandoned which is incorporated by reference herein in its entirety.

TECHNICAL FIELD

The present invention relates to the field of computer security, and more particularly to a device and method for the prevention of unauthorized intrusion into computer networks and systems. The predominant current usage of the present inventive intelligent network security device and method is in the interface between local area networks and the internet.

BACKGROUND ART

The need for network security today is beyond question. Not only are there thieves intent on stealing valuable data and putting it to their own misuse, computer networks must also be made secure against the many pranksters who would introduce viruses and generally try to cause trouble for reasons more arcane or obtuse.

The need for simple security measures has been apparent essentially since the inception of computers. Before computers were hooked together into networks, physical security (keeping unauthorized users away from the computer) was generally deemed adequate. Passwords, often supplemented the physical security, were initially used as essentially the only means of computer based security, even after computers were linked together into private local and wide area networks. But the devious nature of the human mind is such that many view a locked door as a challenge rather than as a barrier which should not be passed. Inevitably, people with less than honorable intentions learned to bypass passwords and other such simple security devices. In response, improved security devices and methods were implemented and, in turn, in response to that there were developed means and methods to defeat the improved security.

With the advent of the internet, the traditional security concerns have yet another aspect. When a computer system is connected to and interacting with the internet, it is no longer possible to deny access outright to the outside world, or to limit such access to a select few users with whom elaborate individual security measures can be taken. By definition, a computer network which interfaces with the internet is connected to every other computer and network on he internet. The only things preventing unauthorized access are the security measures employed by the individual networks. A rather thorough discussion of the need for and history of computer security is found in Computer Security Basics by Deborah Russell and G. T. Gangemi Sr., published by O'Reilly & Associates, Inc.

In short, in considering computer network security in relation to the internet, two of the important aspects are generally in opposition. Securing the confidentiality of data is important, but so is maintaining the availability of the network and data therein to authorized users. In a very narrow sense, the ultimate security would be to disconnect the network from the internet altogether. However, this usually is clearly an unsatisfactory repair, since it negates the useful purposes for which the network was connected to the internet in the first place. Indeed, to disrupt or disconnect the services provided by a network to users who might access it through the internet is, in many respects, to succumb to those "crackers" who would disrupt the effective security and/or operation of the network.

Within a network, various security measures can be put into place to create what is referred to as a "trusted" network. But there is no effective control over the rest of the world such that users accessing a local area network from without, as through the internet, can in any wise be trusted. One way to protect a trusted local area network without completely cutting off communication to the outside world is to set up a gateway computer (sometimes called a firewall) to isolate local users. Within the security perimeter of the local network, users may be able to communicate freely. However, all messages sent to or from users outside the local area network must pass through the firewall computer, or set of computers, which will check, route, and frequently label all information that passes through it. A firewall can be a conventional computer running specific firewall software, or a dedicated computer device specifically constructed or configured as a firewall. The firewall can be dedicated solely to performing the firewall functions, or it can also perform additional functions such as packet routing, or the like, in addition to its firewall functions.

As can be appreciated in light of the above discussion, there is no such thing as a completely secure system. The best that can be hoped for is to stay one step ahead of those persons who would circumvent existing security measures. Accordingly, those who use firewalls are consistently attempting to update the programming of the firewall such that new methods for penetrating the firewall will be detected and abated. A well known recent program named "Satan", which was produced and made public by Dan Farmer, has a script of known methods by which network security can be breached, and Satan goes through this script attempting to break into a network. Satan was developed to perform a good faith security check on systems, and that is why it was made publicly available. A program named "Gabriel" has been developed to recognize a Satan attack and to alert the system to such an attack. This is illustrative of the fact that a firewall can be programmed to recognize a known type of attack on the system. The firewall can also be programmed to block access to a recognized attacker.

To the inventor's knowledge, the firewall systems described above represent the current state of the art in network security devices. Such firewalls are quite effective at detecting and blocking the particular types of network security breach attempts which are anticipated in the configuration and programming of the firewall. More specifically, such firewalls will block data packets according to the specific set of rules that is programmed into the firewall. Examples of such rules are; that a packet has to be addressed to a valid machine on the network, that the packet cannot purport to be from a machine on the network, and that packet addresses cannot be any of the known invalid addresses.

Despite their effectiveness for their intended purpose, known prior art firewalls will not provide the sort of flexibility which may be needed in the future. In particular, existing firewalls are not readily adaptable to provide a variety of responses based upon dynamically modified information. Moreover, existing firewalls are subject to breach by any new and unique methods for circumventing security, at least until the programming of such a firewall is modified to block such new methods.

A U.S. Pat. No. 5,606,668, issued to Shwed, teaches a method for easily programming a firewall. While Shwed provides a very useful invention, in that it allows a firewall to be easily a quickly reprogrammed as necessary, it does not address the problem that it is litereally impossible to detect many sophisticated intrusion attempts by examining packets one at a time. That is, there may seemingly be nothing about any single packet which might alert an observer to the fact that something is amiss with a series of communications. Nor does Schwed does teach or predict a controller which will directly dynamically control a firewall without operator intervention. That is, although the Scwed invention provides a significant improvement, with the exception of the improved programming method, the invention taught by Shwed provides a programmed packet filter which is not different from the prior art.

DISCLOSURE OF INVENTION

Accordingly, it is an object of the present invention to provide a method and means for recognizing known and previously unknown types of attempts at breaching network security.

It is still another object of the present invention to provide a method and means for controlling a network firewall to block sophisticated attempts at breaching network security.

It is yet another object of the present invention to provide a method and means for providing network security while also providing minimal interference with normal usage of the network.

It is still another object of the present invention to provide a method and means for intelligently controlling access to a computer network from outside sources.

it is yet another object of the present invention to provide a method and means for controlling network security which will see attempts to contact even "rogue" computers within a network, those being computers which are not specifically known to a network administrator.

It is yet another object of the present invention to provide a network security means and method which uses artificial intelligence techniques, including adaptive pattern recognition, to recognize attempted security breaches.

It is still another object of the present invention to provide a network security means and method which can provide an adaptable response appropriate to both the type of breach attempt and the source and quantity of such breach attempts.

Briefly, the preferred embodiment of the present invention is an intelligent network security device residing within a computer local area network, which device will examine information being communicated within the network. In an Ethernet system, the device will examine data packets to recognize suspicious patterns of behavior. The device will be connected to control a firewall such that unauthorized or disruptive outside users will be blocked from accessing the network. Blocking will occur in several degrees, depending upon the assigned seriousness of a breach attempt, such that less serious perceived attempts will be allowed to continue to communicate with the network at some level, or to resume communications after a period of time. The various degrees of blocking are provided such that perpetrators of inadvertent improprieties, and the like, will not be punished by absolute banishment from the system—which result would, itself, probably be an undesirable effect.

An advantage of the present invention is that each and every specific type of attempt at breaching network security need not be known and anticipated.

A further advantage of the present invention is that interference with normal network traffic is minimal.

Yet another advantage of the present invention is that it can be used with existing computers, networks, and peripheral hardware.

Still another advantage of the present invention is that it is not dependent upon knowing the exact configuration of a network and/or the exact inventory of users on the network.

These and other objects and advantages of the present invention will become clear to those skilled in the art in view of the description of the best presently known modes of carrying out the invention and the industrial applicability of the preferred embodiments as described herein and as illustrated in the several figures of the drawing.

BEST MODE FOR CARRYING OUT THE INVENTION

This invention is described in a preferred embodiment in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the present invention. For example, the present invention may be implemented using any combination of computer programming software, firmware or hardware. As a preparatory step to practicing the invention or constructing an apparatus according to the invention, the computer programming code (whether software or firmware) according to the invention will typically be stored in one or more machine readable storage devices such as fixed (hard) drives, diskettes, optical disks, magnetic tape, semiconductor memories such as ROMs, PROMs, etc., thereby making an article of manufacture in accordance with the invention. The article of manufacture containing the computer programming code is used by either executing the code directly from the storage device, by copying the code from the storage device into another storage device such as a hard disk, RAM, etc. or by transmitting the code on a network for remote execution. The method form of the invention may be practiced by combining one or more machine readable storage devices containing the code according to the present invention with appropriate standard computer hardware to execute the code contained therein. An apparatus for practicing the invention could be one or more computers and storage systems containing or having network access to computer program(s) coded in accordance with the invention, and the method steps of the invention could be accomplished by routines, subroutines, or subparts of a computer program product.

Figure 1:
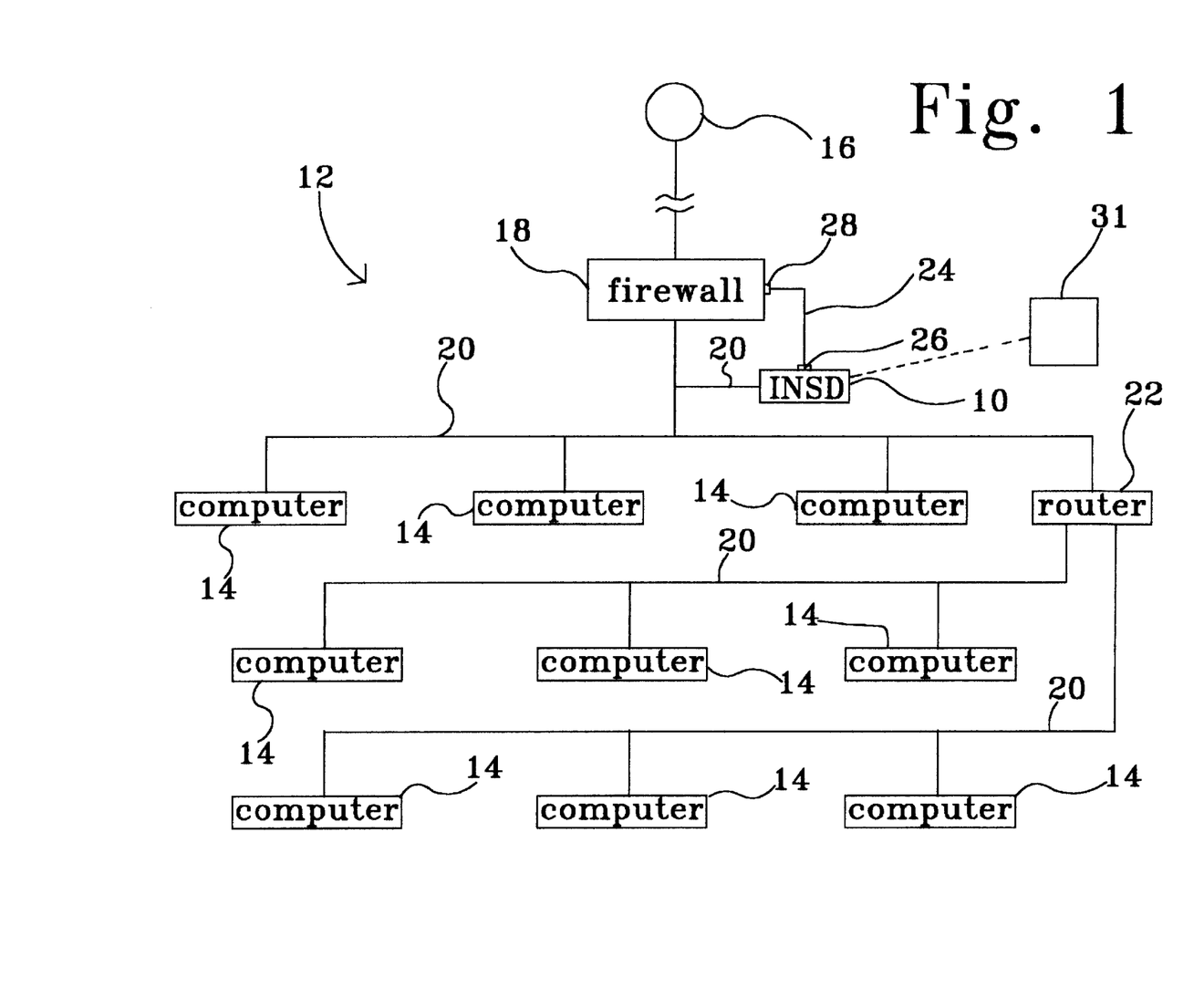
FIG. 1 is a diagrammatic view of a local area network incorporating an inventive intelligent network security device according to the present invention.

The inventive INSD is depicted in a diagrammatic view in FIG. 1 and is designated therein by the general reference character 10. The INSD 10 is a part of a local area network ("LAN") 12 having a plurality of computers 14 (nine computers 14 are depicted in the example of FIG. 1). The LAN 12 is connected to the internet 16 through a firewall 18. The computers 14, and other devices in the LAN 12 are interconnected through a plurality of interconnecting data transmission media (such as wires, fiber optics, radio waves, and the like), and preferably wires 20, in the conventional manner.

In the example of FIG. 1, the best presently known embodiment 10 of the present invention has the LAN 12 using an Ethernet communication protocol and configuration. However, this is not a necessary aspect of the invention, and it is anticipated that the inventive INSD 10 can be used, or adapted for use, with essentially any type of LAN 12 configuration. Also, while the LAN 12 is depicted, in the example of FIG. 1, as being connected to the internet 16 through the firewall 18, the present invention is equally applicable to any situation where it is desired to isolate the LAN 12 from other devices by means of the firewall 18, as where the LAN 12 might be hard wired, or bridged, through the firewall 18 to another LAN (not shown), or other such variation.

In the simplified example of FIG. 1, a router 22 is shown interposed between some of the computers 14 and others of the computers 14 on the LAN 12. One skilled in the art will recognize that other devices, such as bridges, hubs, and the like, are commonly used in Ethernet and other LAN network configurations. The router 22 is shown in the example of FIG. 1 merely as a typical device which might, in some way, separate or segregate the computers 14 from other such devices on the LAN 12.

The INSD 10 is positioned in the LAN 12 such that it will see all Ethernet packets traveling through the firewall 18, whether such packets are directed into the LAN 12 from the internet 16 or from the LAN 12 into the internet 16. That is, the INSD 10 is positioned in the LAN 12 such that the router 22, or other such devices as may be used in a particular LAN 12, will not filter or interfere with the ability of the INSD 10 to monitor traffic into and out of the entire LAN 12.

In the example of FIG. 1, the inventive INSD 10 communicates directly with the firewall 18 through a serial cable 24 connected between a first serial port 26 of the INSD 10 and a second serial port 28 of the firewall 18. Although it would be possible, and within the scope of the present invention, to accomplish all communication between the INSD 10 and the firewall 18 through the interconnecting wires 20 of the LAN 12, the inventor believes that the use of the serial cable 24, as seen in the example of FIG. 1, will provide more effective and simpler means of communication between the INSD 10 and the firewall 18.

Figure 2:
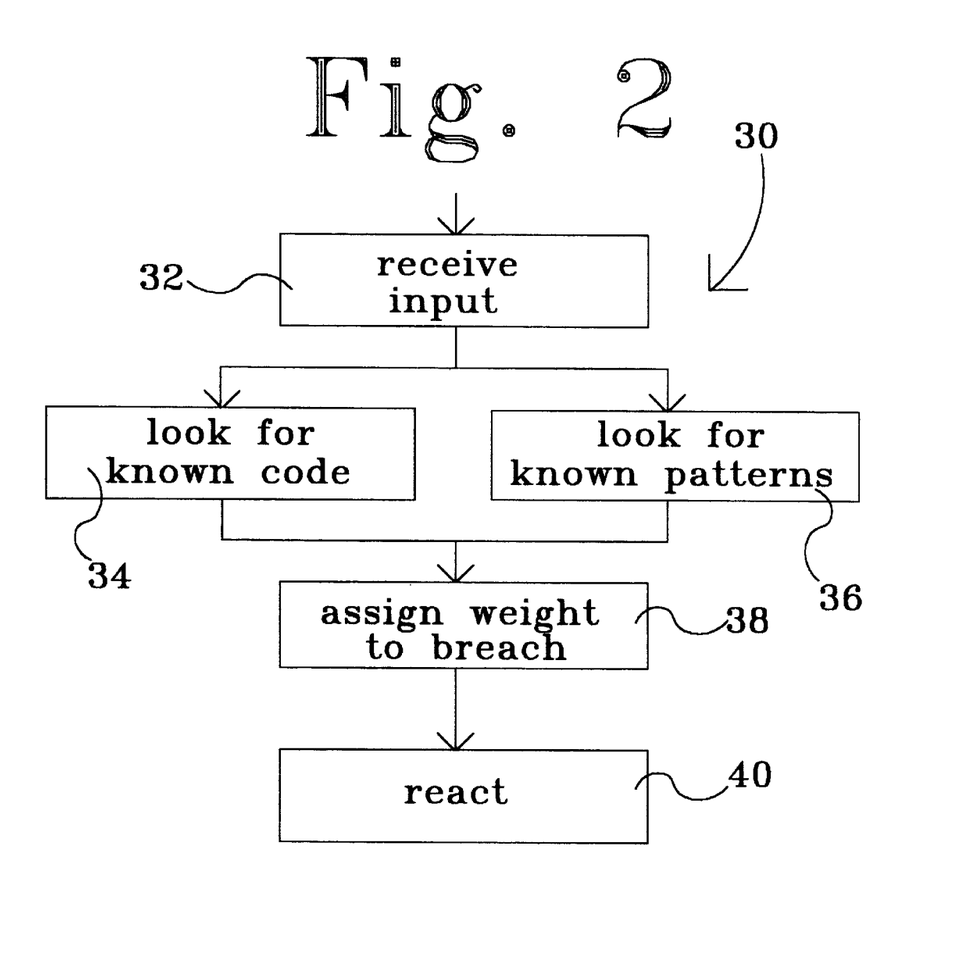
FIG. 2 is a flow diagram of an example of the inventive intelligent network security method.

FIG. 2 is a flow diagram depicting an example of the best presently known embodiment of the inventive intelligent security method 30. As discussed previously herein, the inventive method 30 will be accomplished using software routines and may be physically embodied in a medium such as a floppy disk 31 (FIG. 1), CD ROM, or the like, for transport and for placing the code embodying the inventive method into the INSD 10. According to the intelligent network security method 30, the INSD 10 will monitor all Ethernet packets coming or going through the firewall 18 in a 'receive input, operation 32. It should be recognized that the 'receive input' operation 32 and, indeed, the entire intelligent network security method 30 will be repeated continuously during the operation of the INSD 10.

Following the receive input, operation 32, is a 'look for known code' operation 34. In the look for known code, operation 34, the INSD 10 will compare the data in each Ethernet packet to data known to be indicative of security breach attempts. It will be noted that this 'look for known code' operation 34 is, by itself, in many respects not unlike the known prior art method of examining data for known bits of code, packet addresses, or other data characteristics, to determine if a security breach is being attempted. However, the 'look for known code' operation 34 is generally distinguishable in that according to the present inventive method 30, the data packets are being examined and analyzed in essentially real time rather than by reference to log files.

As can be seen in the example of FIG. 2, operating generally simultaneously with the 'look for known code' operation 34 in the best presently known embodiment 30 of the inventive method is a 'look for known patterns' operation 36. In the 'look for known patterns' operation 36, the INSD 10 will examine patterns of activity on the LAN 12. One skilled in the art will recognize that this will require that the INSD 10 retain certain data for a limited amount of time, as it is patterns of activity over time (as compared to a particular sequential data portion, itself) that is being examined here. While the inventor anticipates that many such patterns will be discovered and or developed as the inventive INSD 10 is put into widespread use, patterns which are now anticipated to be of interest include an ordered attempt to access each machine in a network. That is, many attempts to breach network security involve methodically going through each access point in a network looking for a "weak link". This pattern is relatively independent of the particular means that is being used to try to breach security at each such access port. Yet another example of the 'look for know patterns' operation 36 involves the fact that it can be known that certain types of commands will issue from certain types of users. When a command restricted to one type of user is followed by a command restricted (or generally associated with) another type of user—both coming from the same sender address - then a pattern of suspicious activity has been detected.

Another pattern which is considered to be of interest would be an attempt to access machines or access ports which do not exist. This would tend to indicate an outsider who does not actually know the configuration of the network. While a single, or even a few, such attempts might be indicative of an honest mistake, a great number of sequential attempts to access machines or access ports which do not exist would tend to indicate a real attempted security breach.

Yet another pattern which is considered to be of interest would be an attempt to access a port which is either not used at all or which is not used for the type of communication being attempt. Here, also, a small number of such attempts might be ignored (depending on the sensitivity of the data being protected) while a large number of such attempts would leave little doubt of a methodical attempt at intrusion.

Still another pattern which will be of interest will be a quantity of "responses" from machines on the internet 16 to which no corresponding inquiries have been sent from the LAN 12. This would be indicative of a type of service blocking intrusion which has recently become popular. For example, a perpetrator might broadcast a signal through the internet 16 which falsely purports to come from the LAN 12. Subsequently, the multitude of responses (such as synchronization requests) forthcoming though the internet 16 to the LAN 12 could completely tie up the LAN 12.

It should be noted that, in order for the 'look for known patterns' operation 36 to be successful, the INSD 10 might require some knowledge of the configuration of the LAN 12 (as illustrated by several of the examples above). This data can be stored in the memory of the INSD 10. While it is certainly possible that a network administrator could manually update this data each time a change is made to the LAN 12 configuration, it is more practical and more likely that existing and future means for automatically determining the configuration of the LAN 12 will be employed to obtain such data for storage in and use by the INSD 10.

Following the 'look for known patterns' operation 36 and the 'look for known code', operation 34 in the best presently known embodiment 30 of the inventive method is an 'assign weight to breach' operation 38. In the 'assign weight to breach' operation 38 an average of various factors (two factors, in the example of the best presently known embodiment 30 of the present inventive method) is computed. In the best presently known embodiment 30 of the present inventive method, one of the two factors is the sensitivity of the data which an attempted security breach is trying to access. For example, if the data being protected is of only mid-level importance, then it might be assigned a value of "0.511 on a scale of "'10.011 to "11.011. The other factor used in the best presently known embodiment 30 of the present inventive method is the perceived sophistication of the attempted security breach. For example, if the perceived attempted security breach were only questionably higher than an unartful attempt to legally access the system (such as, for example, entering the wrong "password three times in a row" ) then this factor might be given a weight of 110.211, and the assign weight to breach' operation 38 would assign an average of %'0.111 in this particular iteration of the inventive intelligent network security method 30.

It should be noted that the above factors and figures are given by way of example only. It is contemplated that network security administrators will discover many factors that might or should be considered in the assign weight to breach, operation 38. It should also be noted that each of these factors might not be considered to be equally important, and so a weighted average might be used instead of the simple average used in the present example. Also, it is likely that some factors might be considered so important as to require overriding the averaging process altogether. For example, if extremely sensitive data is concerned, any sort of perceived attempted security breach might be considered sufficient to completely shut down access to that data. In such an example, the 'assign weight to breach' operation 38 could be configured so as to provide an output value of "1.011 regardless of the value of other factors. Also, it might be desirable to use a minimum value of 110.111 rather than "0.01 such that a lowest value of one factor would not set the average value to zero. Therefore, even if one factor were to be extremely low, then very high values of other factors could result in a high output value from the 'assign weight to breach' operation 38. It should also be noted that it is entirely within the scope of the present inventive method to use other and/or more sophisticated calculations to decide the outcome provided in the example of the best presently known embodiment 30 of the present inventive method by the assign weight to breach' operation 38.

Following the assign weight to breach' operation is a 'react' operation 40. In the 'react' operation 40, the INSD 10 (FIG. 2) will send a control signal to the firewall 18 via the serial cable 24. The control signal will direct the firewall 18 to take any of a number of prescribed actions, based upon the value assigned in the assign weight to breach' operation (or variations thereof, as described above or such as may be developed in the future).

It should be noted that the above operations differ considerably from the prior art in respects including that the firewall 28 is dynamically programmed, in essentially real time, according to a number of factors. Therefore, the firewall 28 is enabled to provide an appropriate response and, as described above, to change that response according to factors deemed appropriate. This is as compared to a prior art firewall which, no matter how sophisticated it's programming, can only accept or reject packets according to such programming and cannot, as in the example provided herein, reject packets according to other more sophisticated criteria as described by way of example hereinafter.

An example of the various actions which it is anticipated might be directed in the 'react' operation 40 is to block all access to the LAN 12 from a sender which has been detected as attempting the security breach. Another example would be to disallow access from such a sender for a prescribed period of time only. Yet another example would be to disallow access by such a user only to specific machines or blocks of data within the LAN 12. More extreme examples would be to completely shut down access to a block of data, or even to the entire LAN 12, by any user until the network administrator has time to evaluate the security breach and take appropriate action. Different variations and/or combinations of these outcomes will be situationally appropriate for application in the 'react' operation 40.

A variation of the 'react' operation 40 which could be used instead of, or in addition to, that described previously herein would have the INSD 10 send a signal through the interconnecting wires 20 out through the firewall 18 to devices on the internet 16. An example would be to send a reset signal to a device in the internet 16 that was, itself, sending a disruptive signal or an excess of data to the LAN 12. This would be particularly appropriate where an innocent sender has been tricked to send such disruptive communications, as described in an example discussed in relation to the prior art herein.

It should be noted that the best presently known embodiment 30 of the intelligent network security method has been illustrated herein as a generally linear process which operates generally continuously and repeatedly as incoming data packets are received on the LAN 12. In this example, variations in outcome are achieved by assigning weights or values to certain perceived factors One skilled in the art will be aware that a similar outcome could be achieved by programming the INSD 10 to operate according to a branching method wherein different perceived situations (such as a recognized pattern of activity) could cause the decision making within the INSD 10 to branch accordingly.

The present invention is susceptible to numerous modifications and additions. For example, as touched upon briefly previously herein, it is anticipated by the inventor that network security administrators will discover a great many factors which should be weighed in the assign weight to breach, operation 38. Similarly, it is anticipated that outcomes and actions in addition to those specifically discussed herein will be utilized in the 'react' operation.

It is also anticipated that other broad categories of detection operations will be utilized in the future, in addition to the 'look for known code' operation 34 and the 'look for known patterns' operation which are specifically set forth herein as being a part of the best presently known embodiment 30 of the present inventive method.

INDUSTRIAL APPLICABILITY

The inventive intelligent network security device and method are intended to be widely used for improving security in computer systems and networks which are connected to telephonic or other data transfer means such that there is a potential for intrusion into the protected network through such data transfer means.

While the primary anticipated application is in the protection of networks which can be accessed via telephone lines and/or other communications means which provide access to the internet, the present invention is applicable to essentially any situation where it is desired to protect data within a secure computer system from unauthorized or improper access from the outside.

A particular benefit of the present invention is that it is readily adaptable to deal with new and unique means for attempting to breach network security. Indeed, it is anticipated by the inventor that the INSD 10 can be caused to be self learning, in at least some respects, as artificial intelligence is developed relating to network security.

It should be noted that the present inventive INSD 10 will require a considerable amount of processing power for its optimal effectiveness, particularly where a great deal of incoming data must be process and analyzed. However, it should also be noted that, according to the present inventive method 30, the firewall 16 need not have a great deal of processing power because it will generally only be carrying out relatively simple instructions provided form the INSD 10.

It is anticipated by the inventor that future modifications of the INSD 10 and the intelligent network security method 30 might cause the INSD 10 to actually look outward from the LAN 12 into the internet 16 to analyze and discover information about potential breachers of security.

Yet another anticipated modification of the best presently known embodiment 30 of the present inventive method would have the INSD 10 look at data outgoing from the LAN 12 into the internet 16 to look for "inappropriate" outgoing responses or messages from the protected LAN 12.

It should be noted that an element of the present invention is that it looks at patterns of activity over time. The term "over time" is herein specifically defined to mean over a time period which includes the examination of a series of more than one packet, whereby patterns of activity can be detected. For example, different types of users might make different types of requests of a system. Where a packet having characteristics that might typically be sent only by a lower level user is followed by a packet having characteristics that might typically be sent only by a higher level user, it might be assumed that something is amiss. This is true even where both packets might, in and of themselves, be perfectly acceptable such that no system in the prior art could have detected the problem.

Since the intelligent network security device and method may be readily produced and integrated into existing computer networks, and will work in conjunction with existing and anticipated network firewall devices with minimal modifications, and since the advantages as described herein are provided, it is expected that the intelligent network security device and method will be readily accepted in the industry. For these and other reasons, it is expected that the utility and industrial applicability of the invention will be both significant in scope and long lasting in duration.

While the usefulness of the present invention is not limited to recognizing patterns of activity over time, this is a clear distinction of the present invention over the prior art. Patterns such as systematic attempts to break a security code can be recognized and a message sent to the firewall to stop (permanently or temporarily ) accepting input from the suspected source and/or other security measures can be initiated. One particular problem with the prior art that is thus addressed according to the present invention involves the fact that Unix based systems replace data in packets with the newer of overlapping data. Clever "crackers" have used this fact to sneak through instructions that simply cannot be stopped by conventional "static" firewall/packet filter devices. An additional aspect of the ability of the present invention to dynamically detect patterns of behavior and control the firewall accordingly, is that security rules can be stated in broad terms of behavior such that attempts to crack security which are not specifically anticipated (new and clever ways of breaking in) can be stopped. The term "control the firewall" is herein specifically defined to mean sending instructions to the firewall to direct it to reject packets which would not otherwise be rejected, given whatever programmed instructions are already existant in the firewall prior to the exercise of such "control". That is, while the "rules" that are programmed in to conventional firewall systems (such as those programmed in according to the inventive method of the Shwed patent, cited previously herein) can effectively define what sorts of packets will be admitted to a network—in terms of addresses, imbedded codes, and many other criteria, these can all be duplicated by a sufficiently clever cracker to circumvent security. However, attempts at such circumvention will generally be characterized by a pattern of activity which can be detected according to the present invention, and the proper action can be taken automatically by the controller without immediate operator intervention. The "proper action" can include (but will not be limited to) the permanent rejection of all packets sent from a user, the temporary rejection of such packets, or—as in the case of a detected deliberate breach of a high security system—the shutting down of communications to that system entirely until the nature and source of the breach can be more fully analyzed.

All of the above are only some of the examples of available embodiments of the present invention. Those skilled in the art will readily observe that numerous other modifications and alterations may be made without departing from the spirit and scope of the invention. Accordingly, the above disclosure is not intended as limiting and the appended claims are to be interpreted as encompassing the entire scope of the invention.

I claim:

1. In a computer system connected to an external communications medium, a security device comprising:

a programmable firewall device interposed between the computer system and the external communications medium;

a controller device configured within the computer system such that said controller device can access all communications into and out of the computer system; and a communications device for communicating instructions from said controller device to said firewall device for controlling said firewall device; wherein said controller device examines communications incoming to the computer system to detect attempted security breaches; and the controller device continuously controls the firewall during the operation of the computer system to block communications between the computer system and the external communications medium when an attempted security breach is detected.

2. The computer system of claim 1, wherein:
the computer system is a local area network.

3. The computer system of claim 1, wherein:
the external communications medium is the internet.

4. The computer system of claim 1, wherein:
the computer system is a local area network operating as an Ethernet network.

5. The computer system of claim 1, wherein:
the controller device examines communications incoming to the computer system for code known to be associated with attempted security breaches.

6. The computer system of claim 1, wherein:

the controller device examines communications incoming to the computer system for patterns of activity indicative of attempted security breaches.

7. The computer system of claim 1, wherein:

the communications device is a serial data communications link.

8. The computer system of claim 1, wherein:

the controller assigns a value to a perceived attempted security breach;

and the controller controls the firewall to block communications between the computer system and the external communications medium for a predetermined period according to the value assigned to the perceived attempted security breach.

9. The computer system of claim 1, wherein:

the controller assigns a value to a perceived attempted security breach;

and the controller controls the firewall to block communications between a selected portion of the computer system and the external communications medium according to the value assigned to the perceived attempted security breach.

10. The computer system of claim 1, wherein:

the controller is a general purpose computer programmed to function as described in claim 1.

11. The computer system of claim 1, wherein:

the controller and the firewall are each physically distinct computerized units.

12. In a local area network attached to a wide area network, a method for improving the security of the local area network, comprising:

monitoring communications between the local area network and the wide area network;

determining, over time, if the communications between the local area network and the wide area network contain patterns of activity indicative of an attempted security breach; and generally simultaneously controlling a firewall to selectively block communications between the local area network and the wide area network depending upon a classification of the attempted security breach.

13. The method of claim 12, wherein:

the wide area network is the internet.

14. The method of claim 12, wherein:

the local area network is an Ethernet local area network.

15. The method of claim 12, wherein:

the classification of the attempted security breach includes a factor relating to the importance of a portion of the local area network which the attempted security breach attempts to access.

16. The method of claim 12, wherein:

the classification of the attempted security breach includes a factor relating to the number of attempts made in the course of the attempted security breach.

17. The method of claim 12, wherein:

the classification of the attempted security breach includes a factor relating to the relative sophistication of the attempted security breach.

18. The method of claim 12, wherein:

the classification of the attempted security breach is accomplished by a controller unit which is physically distinct from a firewall unit.

19. The method of claim 18, wherein:

the firewall unit is controlled through a serial datalink from the controller unit.

* * * * *

(12) EX PARTE REEXAMINATION CERTIFICATE (10490th)
United States Patent
Shipley (10) Number: US 6,119,236 C1
(45) Certificate Issued: Jan. 30, 2015

(54) INTELLIGENT NETWORK SECURITY DEVICE AND METHOD

(75) Inventor: Peter M. Shipley, Berkeley, CA (US)

(73) Assignee: Enhanced Security Research, LLC, Berkeley, CA (US)

Reexamination Request:
No. 90/010,849, Feb. 2, 2010

Reexamination Certificate for:
Patent No.: 6,119,236
Issued: Sep. 12, 2000
Appl. No.: 09/210,057
Filed: Dec. 10, 1998

Related U.S. Application Data

(63) Continuation-in-part of application No. 08/726,563, filed on Oct. 7, 1996, now abandoned.

(51) Int. Cl.
*H04L 29/06* (2006.01)

(52) U.S. Cl.
USPC .......................................... 726/22; 713/153

(58) Field of Classification Search
USPC ......................................................... 713/201
See application file for complete search history.

(56) References Cited

To view the complete listing of prior art documents cited during the proceeding for Reexamination Control Number 90/010,849, please refer to the USPTO's public Patent Application Information Retrieval (PAIR) system under the Display References tab.

*Primary Examiner* — Mary Steelman (57) ABSTRACT

An intelligent network security device ("INSD") (10) operates in a local area network ("LAN") (12) according to an intelligent network security method (30). The LAN (12) has a plurality of computers (14) and connects to the internet (16) through a firewall (18). The INSD (10) resides within the LAN (12) such that data traversing between the LAN (12) and the internet (16) is accessible thereto. The INSD (10) looks for code and patterns of behavior and assigns a value to perceived attempted security breaches. The INSD (10) then directs the firewall (16) to take any of a prescribed plurality of actions, based upon such value.

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claim 6 is now disclaimed.

Claims 1-5 and 7-19 are cancelled.

* * * * *